(12) United States Patent
Tsirkin

(10) Patent No.: US 11,265,247 B2
(45) Date of Patent: Mar. 1, 2022

(54) DOWNTIME REDUCTION WITH VF MAC FILTER PROGRAMMING BY HYPERVISORS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 16/411,296

(22) Filed: May 14, 2019

(65) Prior Publication Data
US 2020/0366603 A1 Nov. 19, 2020

(51) Int. Cl.
*H04L 12/741* (2013.01)
*H04L 45/74* (2022.01)
*G06F 9/455* (2018.01)

(52) U.S. Cl.
CPC .......... *H04L 45/74* (2013.01); *G06F 9/45558* (2013.01); *G06F 2009/45595* (2013.01)

(58) Field of Classification Search
CPC .............................. H04L 45/74; G06F 9/45558
See application file for complete search history.

(56) References Cited

U.S. PATENT DOCUMENTS

| | | | |
|---|---|---|---|
| 7,962,647 B2 | 6/2011 | Suri et al. | |
| 9,600,309 B2 | 3/2017 | Prawer et al. | |
| 9,600,313 B2 | 3/2017 | Nimmagadda et al. | |
| 10,509,758 B1* | 12/2019 | Habusha | G06F 13/4022 |
| 2008/0148181 A1* | 6/2008 | Reyes | G06Q 10/109 |
| | | | 715/801 |
| 2011/0103259 A1* | 5/2011 | Aybay | H04L 45/306 |
| | | | 370/254 |
| 2012/0016970 A1* | 1/2012 | Shah | G06F 15/177 |
| | | | 709/220 |
| 2013/0034094 A1* | 2/2013 | Cardona | H04L 49/70 |
| | | | 370/360 |
| 2015/0195246 A1* | 7/2015 | Ryu | G06F 21/85 |
| | | | 370/431 |
| 2016/0098365 A1* | 4/2016 | Bshara | G06F 13/105 |
| | | | 710/104 |
| 2016/0232019 A1 | 8/2016 | Shah et al. | |
| 2017/0212784 A1 | 7/2017 | Johnsen et al. | |
| 2017/0337073 A1* | 11/2017 | Tsirkin | G06F 13/102 |

OTHER PUBLICATIONS

"SR-IOV Component Architecture and Interaction." VMware Docs Home, Aug. 15, 2013, docs.vmware.com/en/VMware-vSphere/6.5/com.vmware.vsphere.networking.doc/GUID-DD13D453-98B9-4D26-85EA-A738293AEE00.html.

(Continued)

*Primary Examiner* — Kevin M Cunningham
(74) *Attorney, Agent, or Firm* — Haynes and Boone, LLP

(57) ABSTRACT

A method includes, with a hypervisor, receiving, with a Physical Function (PF) of a network device, a data packet destined for a virtual machine (VM), forwarding the data packet to the VM, detecting an event that indicates that a driver for a virtual network device associated with the VM is up, in response to detecting the event, programming a device address filter of the PF, and with the network device, after the device address filter is programmed, forwarding incoming data packets destined for the VM directly to a Virtual Function (VF) associated with the virtual network device.

20 Claims, 4 Drawing Sheets

(56) References Cited

OTHER PUBLICATIONS

"Intel® 82599 SR-IOV Driver Companion Guide—Overview of the Intel Ixgbe SR-IOV Driver Implementation." Intel Corporation , May 2010, www.intel.com.au/content/dam/doc/design-guide/82599-sr-iov-driver-companion-guide.pdf.
"I40E/IXGBE/IGB Virtual Function Driver " 15 I40E/IXGBE/IGB Virtual Function Driver—Data Plane Development Kit 17.05.2 Documentation, 2010-2014, doc.dpdk.org/guides-17.05/nics/intel_vf.html.

* cited by examiner

US 11,265,247 B2

DOWNTIME REDUCTION WITH VF MAC FILTER PROGRAMMING BY HYPERVISORS

BACKGROUND

The present disclosure relates generally to virtual computing systems, and more particularly, programming device address filters to allow for direct forwarding of incoming data packets.

A host machine (e.g., computer or server) is a computing system that is typically enabled to simultaneously run one or more virtual machines, where each virtual machine may be managed by a hypervisor and used by a local or remote client. A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

Device passthrough is a way to enable networking for virtual machines, where incoming packets are received by a physical function device. The incoming packets may be filtered based on the incoming packets destination device address, and as a result, are forwarded to a virtual function. The virtual function may then send the packet directly to a virtual function driver within the guest.

SUMMARY

According to one example, a method includes, receiving, with a Physical Function (PF) of a network device associated with a hypervisor, a data packet destined for a virtual machine supported by the hypervisor, with the hypervisor, forwarding the data packet to the virtual machine, with the hypervisor, detecting a guest access to a virtual network device associated with the virtual machine is up, with the hypervisor, in response to detecting the event, programming a device address filter of the PF, and with the network device, after the device address filter is programmed, forwarding incoming data packets destined for the virtual machine directly to a Virtual Function (VF) associated with the virtual network device.

According to one example, a system includes a processor, and a memory comprising machine readable instructions that when executed by the processor, cause the system to: receive, with a Physical Function (PF) of a network device associated with a hypervisor, a data packet destined for a virtual machine supported by the hypervisor, forward the data packet to the virtual machine; detect an event that indicates that a driver for a virtual network device associated with the virtual machine is up, program, in response to detecting the event, a device address filter of the PF, and forward, after the device address filter is programmed, incoming data packets destined for the virtual machine directly to a Virtual Function (VF) associated with the virtual network device.

According to one example, a non-transitory machine-readable medium comprising a plurality of machine-readable instructions which when executed by one or more processors associated with a server are adapted to cause the one or more processors to perform a method comprising: receiving, with a Physical Function (PF) of a network device associated with a hypervisor, a data packet destined for a virtual machine supported by the hypervisor, forwarding the data packet to the virtual machine, detecting an event that indicates that a driver for a virtual network device associated with the virtual machine is up, in response to detecting the event, programming a device address filter of the PF, and after the device address filter is programmed, forwarding incoming data packets destined for the virtual machine directly to a Virtual Function (VF) associated with the virtual network device.

Figure 1:
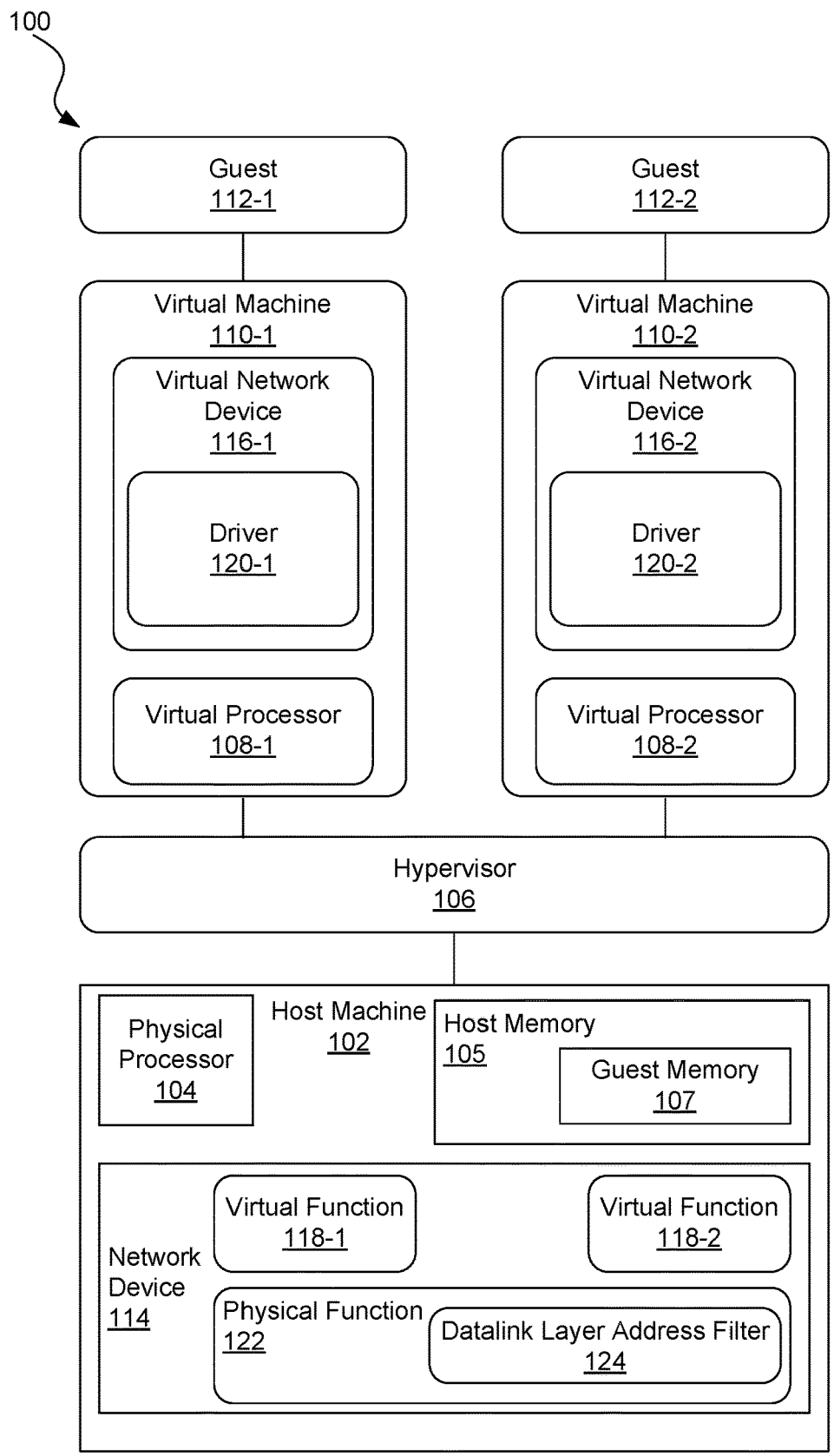
FIG. 1 is a diagram showing an illustrative system involving a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Device passthrough is an efficient way to enable networking for virtual machines. The device passthrough approach includes an incoming data packet that is received by a physical function device. The incoming data packet is filtered based on its destination device address, such as a MAC address, IP address, VLAN tag, etc. The incoming data packet is then forwarded to a virtual function. The virtual function then sends the packet directly to a virtual function driver, which is associated with a virtual network device of a guest. As the number of virtual functions in a host are limited, only a small number of virtual machines can use the virtual functions. Those that do not use the virtual functions can use the physical function of the host network device in a conventional manner. Specifically, incoming data packets are passed to the hypervisor, which then sends it to the appropriate destination virtual machine.

With a subset of the total number of guests able to use the virtual functions it may be desired to allow whichever guests are using more networking resources to be assigned to the virtual functions. Because network usage may change over time, it may be desirable to switch which virtual machines/guests get assigned to one of the virtual functions for efficient passthrough. However, it takes time (sometimes seconds) to make such switches happen. It is possible that data being received will be lost during such a switch. More specifically, virtual functions need to be created and assigned device addresses, such as MAC addresses, ahead of time, which causes the physical function to program the device address filter, and forward packets to the virtual function. As a result, there is a time delay if a virtual network information card is added to the virtual machines dynamically because it takes an extensive amount of time for the guest to detect a new virtual function and bind a virtual function driver to the new virtual function. Furthermore, during this time delay, incoming packets are dropped by the virtual functions. Thus, a need exists to be able to adapt to virtual machines being added dynamically while also reducing the amount of downtime.

According to principles described herein the hypervisor refrains from programming the device address filter of the physical function at start-up. Instead, for example, incoming packets that are coming through the physical function may be directly forwarded by the network device to the hypervisor, which then forwards the packets to the appropriate virtual machine. Then, later, after the virtual driver is up and running and then the filter can be programmed to use the device passthrough feature to directly send packets through without going through the hypervisor.

There are a variety of ways in which it may be determined that the virtual driver for a particular guest is up and running. By way of example, it is highly likely that the driver for the virtual network device will send some kind of command on initialization of the virtual network device. Thus, receipt of such command may be used to determine the status of the driver. Also, for example, other commands received by the physical function may indicate that the driver is available. In another example, in the absence of an appropriate command, the hypervisor can detect a bus master enable. Upon detecting the bust master enable, for example, the hypervisor may deduce that the driver for the virtual network device is up, and as a result, the hypervisor may enable the filter. Thus, the incoming packets may end up in the virtual function, and the incoming packets may be handled directly. As a result, by using the method and system as discussed below, the amount of downtime is reduced, while the system is able to dynamically adapt to multiple virtual machines using varying amounts of network resources. This increases system efficiency, while also allowing for system flexibility.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102. As will be explained in further detail below, a host machine may support more than one hypervisor 106.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses. A certain portion of the host memory 105 is dedicated to guest memory 107. The total guest memory 107 may be made available for multiple guests 112 to use.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The host machine 102 further includes a network device 114. The network device 114 may be configured to include virtual functions 118-1, 118-2, as well as physical function 122. The physical function 122 may be configured to include a device address filter 124. Additionally, for example, the physical function 122 may be configured to receive incoming packets and forward the incoming packets to a virtual function, such as, for example, virtual function 118-1 or virtual function 118-2. By way of further example, the physical function 122 may determine which virtual function should receive the incoming packets by allowing the device address filter 124 to filter the packets based on the device address, such as the MAC address or Internet Protocol (IP) address, of the packet. The virtual function may be configured to send packets directly to a driver within a guest. For example, virtual function 118-1 may be configured to send an incoming packet to driver 120-1 within guest 112-1. By way of further example, virtual function 118-2 may be configured to send an incoming packet to driver 120-2 within guest 112-2.

The network device 114 may also be configured to communicate with a network through a variety of mechanisms such as wireless, Ethernet, or optical communications. Additionally, the virtual machines 110 may include virtual network devices 116-1, 116-2, where the hypervisor 106 maps the virtual network device 116 to the network device 114. The virtual network devices 116-1 and 116-2 may each include a device address such as a MAC address, and a logical address such as an Internet Protocol (IP) address. The virtual network devices 116-1 and 116-2 may be configured to include drivers 120-1 and 120-2. For example, drivers 120-1 and 120-2 may be configured to receive data packets from the virtual functions 118-1 and 118-2 based on the destination device address of the packet matching the device address of the virtual network devices 116-1 and 116-2.

Figure 2:
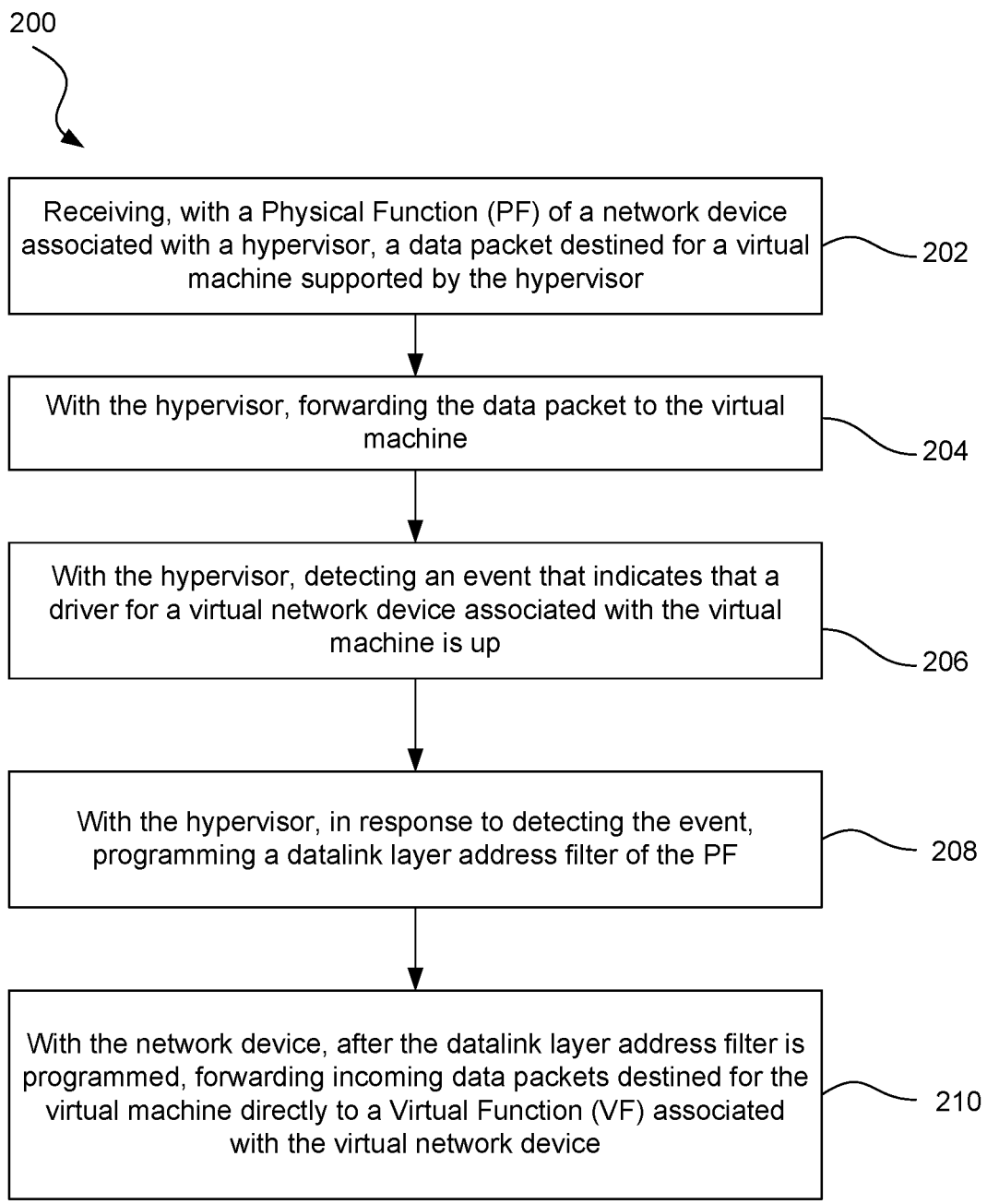
FIG. 2 is a flow diagram showing an illustrative method for programming a device address filter and then forwarding data packets according to the device address filter, according to one example of principles described herein.

FIG. 2 is a flow diagram of a method 200 for programming a device address filter and then forwarding data packets according to the device address filter. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 202, the hypervisor receives, with a Physical Function (PF) of a network device associated with a hypervisor, a data packet destined for a virtual machine supported by the hypervisor. The PF, for example, may allow the hypervisor to make configuration changes to a connected device, such as a network device. A network device may include, for example, a hub, switch, router, bridge, gateway, modem, repeater, or access point.

At action 204, the hypervisor forwards the data packet to the virtual machine. This is done without using the device passthrough feature. In other words, the packet received by the host network device (e.g., 114) gets processed by the hypervisor and forwarded to its virtual machine destination without utilizing the virtual functions 118-1, 118-2. In some examples, the hypervisor may need to assign a device address to the virtual network device in order to indicate the destination virtual machine to the data packet.

At action 206, the hypervisor detects an event that indicates that a driver for a virtual network device associated with the virtual machine is up. In one example, the event may be a guest accessing the host network device. In another example, the event may be receiving a command or indication that the virtual machine is up. By way of further example, the hypervisor may detect that the virtual network device is up by checking the registry or memory of the virtual machine. The hypervisor may also check, for example, the communication channel between the hypervisor and the virtual machine for indications that the driver is up.

At action 208, in response to detecting the event, the hypervisor programs a device address filter of the PF. For example, the device address may be a media access control address (MAC address). Additionally, for example, the MAC address may be used as a network address for most IEEE 802 network technologies, including, for example, Ethernet, Wi-Fi, and Bluetooth. In a further example, the device address may be a unique identifier assigned to a particular virtual network device to allow for the virtual network device to be mapped to the network device by the hypervisor, which allows for communications at the datalink layer of a network segment. By way of further example, different device addresses may correspond to different virtual network devices. For example, the device addresses may be assigned to the virtual network device by the manufacturer, or the device addresses may be assigned to the device by a network administrator. Additionally, the device address is not limited to a MAC address, as different network addresses, such as, different alphanumeric characters or an IP address, may be used as the device address.

For example, the list of device addresses to program the device address filter may be received by the hypervisor from, for example, a host machine, a network administrator, a hypervisor administrator, or a combination of the three. The one or more than one device address may, for example, correspond to particular virtual machines that incoming data packets should be forwarded to. Additionally, for example, the programming of the filter may occur when the hypervisor is started, or the programming of the filter may occur on a dynamic as-needed basis. By way of further example, the device address filter may be told a time period or a quantity of data packets that should be filtered for a particular device address. Additionally, for example, the user or system administrator may choose to send a reset command to the device address filter, where the reset command would clear any of the previous device addresses that the device address filter was programmed with.

At action 210, with the network device, after the device address filter is programmed, forwarding incoming data packets destined for the virtual machine directly to a Virtual Function (VF) associated with the virtual network device. For example, the network device may now forward all incoming packets that are coming through the PF to the VF associated with the virtual network device of a particular virtual machine. Thus, processing resources are saved because the hypervisor does not have to handle the packets and forward them to the appropriate virtual machine.

Additionally, in some examples, the PF and the VF may not be Single Root Input/Output Virtualization (SR-IOV) PF and VF, where the PF is the physical Ethernet controller that supports SR-IOV and the VF is the virtual Peripheral Component Interconnect Express (PCIe) device created from a physical Ethernet controller. Instead, the PF may be any host device and the VF may be any partition of that device, for example.

In some examples, the event that indicates that a driver for a virtual network device is up includes the driver sending a command to the network device. For example, the event may include the driver configuring the network device, registering the network device, or initializing the network device. In some examples, the command includes a command that sets a device address of the virtual network device. For example, the event that indicates that a driver for a virtual network device is up may include the driver sending a command to the network device to set a device address of the virtual network device. By way of further example, the command may include at least one device address that will be assigned to at least one virtual network device.

In some examples, the device address is a Media Access Control (MAC) address. In some examples, the device address is a datalink layer address such as a Media Access Control (MAC) address. For example, the MAC address may be used as a network address for most IEEE 802 network technologies, including, for example, Ethernet, Wi-Fi, and Bluetooth. For example, the MAC address may be a unique identifier assigned to a particular virtual network device, such as a virtual network interface card or a network interface controller, for communications at the datalink layer of a network segment. By way of further example, each of the MAC addresses may correspond to a different virtual network device, such as a virtual network interface card or a network interface controller. Moreover, the MAC address may be, for example, an Ethernet hardware address, a hardware address, or a physical address. For example, the MAC address may be assigned to the virtual network device, such as a virtual network interface card or a network interface controller, by the manufacturer, or the MAC address may be assigned to the device by a network administrator. Additionally, for example, the MAC address may be six groups of two hexadecimal digits, separated by hyphens, colons, or no separator.

In some examples, the at least one approved device address is identical to another device address on a network to which the virtual network device is connected. For example, the virtual network device many be connected to a network, such as, for example, a digital telecommunications network. By way of further example, the network may utilize a communication protocol for exchanging information over the network. Examples of the communication protocol may include, for example, IEEE 802 standards, Ethernet, Wireless LAN, TCP/IP, Bluetooth, and digital cellular standards, which may include GSM and UMTS standards. The virtual network device may have a unique identifier, such as, for example, a device address, which may allow for the network to communicate with the virtual network device.

Figure 3:
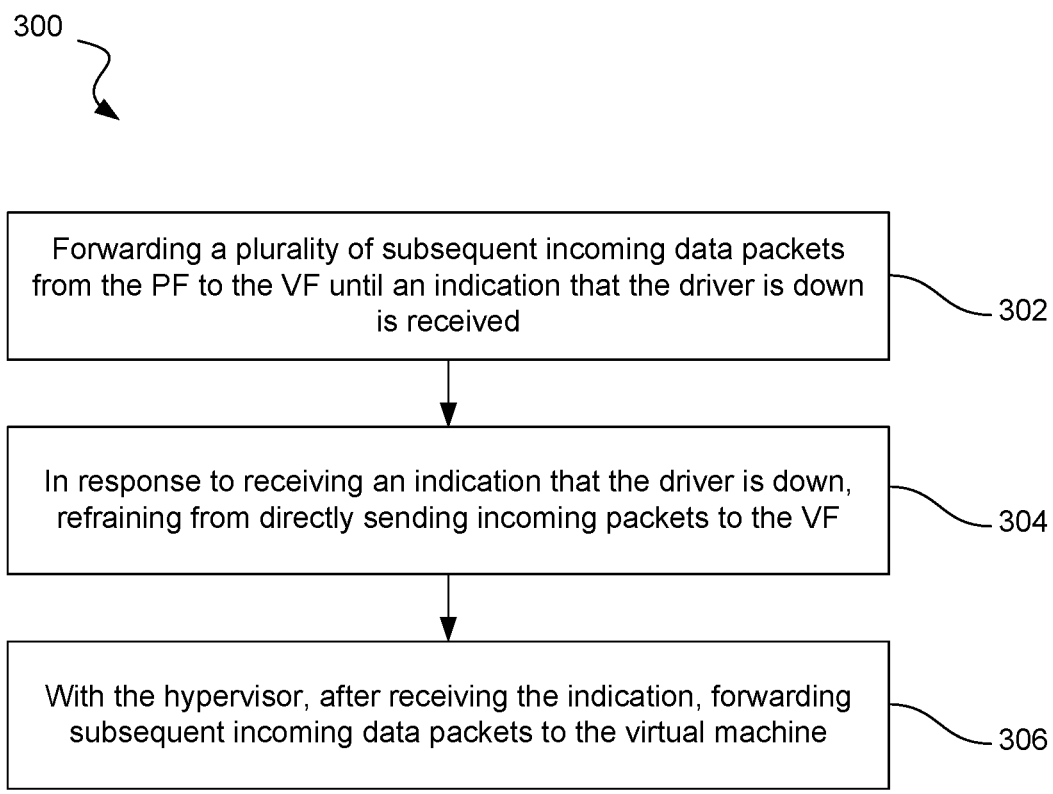
FIG. 3 is a diagram showing an illustrative method for the hypervisor forwarding subsequent incoming data packets directly from the PF to the VF until an indication is received, according to one example of principles described herein.

FIG. 3 is a diagram of method 300 for the hypervisor forwarding subsequent incoming data packets directly from the PF to the VF until an indication is received. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 302, a plurality of subsequent incoming data packets are forwarded from the PF to the VF until an indication that the driver is down is received. This may be done, for example, by a second guest access to the device. For example, the plurality of subsequent incoming data packets may be forwarded to the VF that contains the device address that the device address filter is programmed with. Additionally, for example, the forwarding may be direct forwarding, where data packets are directly forwarded from the PF to the VF. For example, the device address filter may be programmed with more than one device address, where the plurality of subsequent incoming data packets are forwarded to the VF's that contain one of the device addresses that the device address filter is programmed with. By way of further example, the subsequent incoming data packets may be forwarded randomly to the device addresses that are programmed in the device address filter, or there may be a maximum number of data packets that a particular VF receives until the device address filter sends subsequent data packets to a different VF that contains a device address included in the device address filter.

Additionally, the host network device may continue to forward incoming data packets according to the device address filter until an indication that the driver is down is received. For example, the driver may have crashed, and the host network device or hypervisor may receive an alert or message indicating that the driver is no longer functioning. For example, when the guest associated with the virtual machine no longer accesses the network device, the host network device may receive an indication in the form of an alert, which communicates to the host network device that the guest is no longer accessing the network device. By way of further example, a threshold may exist, where the host network device may filter a plurality of subsequent incoming data packets until the number of filtered data packets reaches a threshold amount. Then, for example, the device address filter may wait for an indication that the driver is still up. If the filter receives the indication, for example, that the driver is still up, the host network device may continue forwarding incoming data packets until the threshold is reached, or until an indication that the driver is down is received.

At action 304, in response to receiving an indication that the driver is down, refraining from directly sending incoming packets to the VF. For example, once the host network device receives an indication that the driver has crashed, shut down, or that the guest is no long accessing the network device, the device address filter may be updated and the host network device may stop sending the incoming packets directly to the VF using the passthrough feature. By way of further example, the host network device may have a default or backup VF for the device address filter to send the rest of the incoming data packets. Additionally, for example, the device address filter may request the hypervisor to update or reprogram the device address filter, so that the host network device can continue to forward incoming data packets appropriately.

At action 306, with the hypervisor, after receiving the indication, forwarding subsequent incoming data packets to the virtual machine. For example, after the indication that the driver is down is received, the subsequent incoming data packets may be handled by the hypervisor without using the device passthrough feature.

In some examples, the event that indicates that a driver for a virtual network device is up includes a guest associated with the virtual network device accessing the host network device. For example, it may be the first time that the guest accesses the host network device, or it may not be the first time that the guest accesses the network. By way of further example, there may have been a timeout since the guest last accessed the network device. For example, the timeout may be a particular amount of time since the guest last accessed the network device, where the particular amount of time may be a default amount of time or an amount of time set by the administrator or user.

In some examples, the event that indicates that a driver for a virtual network device is up includes a bus master enable command. For example, bus mastering allows a control bus to communicate directly with other components of the system without having to go through the CPU. Additionally, for example, bus mastering significantly improves performance for operating systems by allowing for the direct communication. When the bus master is enabled, this indicates that the drive is up and running.

Figure 4:
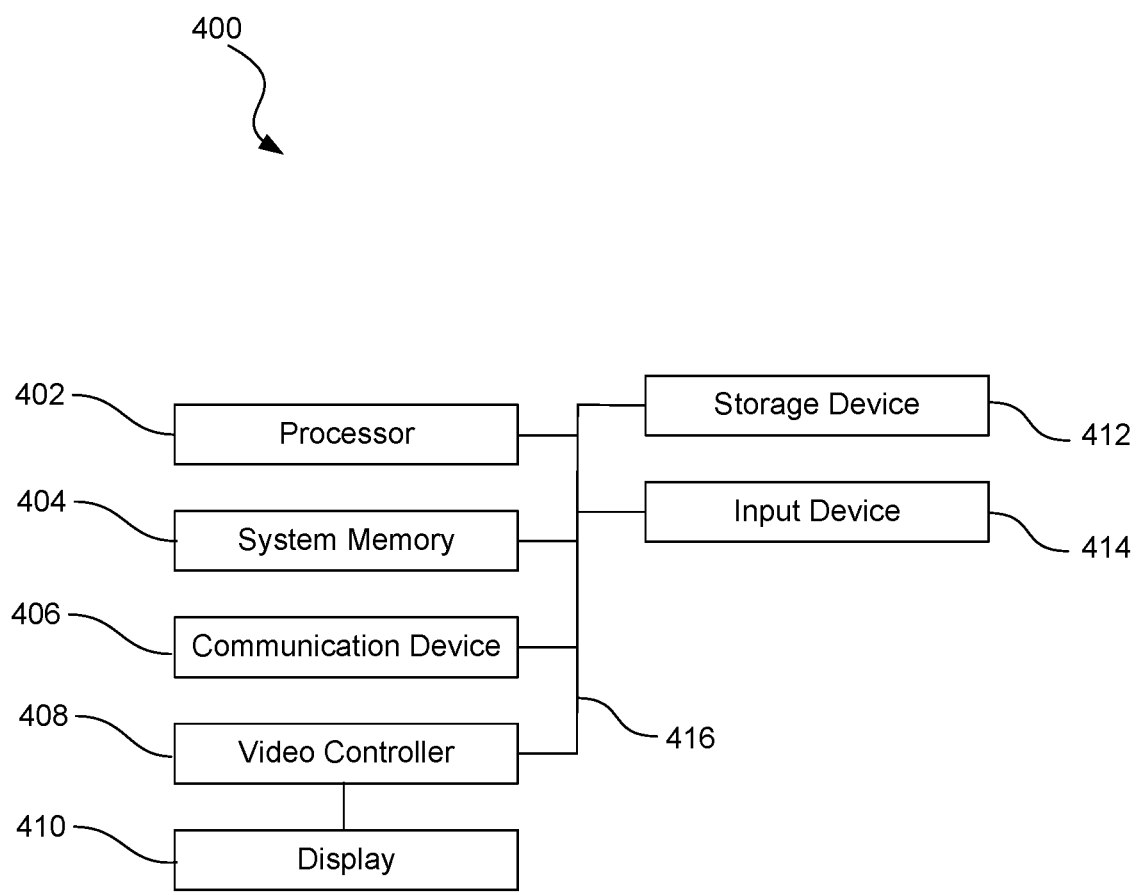
FIG. 4 is a diagram showing an illustrative computing system that may be used for assigning a requested device address to a virtual network device associated with the guest, according to one example of principles described herein.

FIG. 4 is a diagram showing an illustrative computing system 400 that may be used to perform the programming of the device address filter. According to the present example, the computing system 400 includes a processor 402, an input device 414, a storage device 412, a video controller 408, a system memory 404, a display 410, and a communication device 406, all of which are interconnected by one or more buses 416.

The storage device 412 may include a computer readable medium that can store data. The storage device 412 may include volatile memory storage devices such as Random Access Memory (RAM) as well as non-volatile memory storage devices such as solid state memory components. The computer readable medium may be a non-transitory tangible media.

In some examples, the communication device 406 may include a modem, network card, or any other device to enable the computing system 400 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 400 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 404, and/or any combination thereof, may be executed by a processor 402 to cause the processor 402 to carry out or implement in whole or in part the operation of the computing system 400, one or more of the methods. In some examples, such a processor 402 may execute the plurality of instructions in connection with a virtual computer system.

Some examples of processing systems described herein may include non-transitory, tangible, machine readable media that include executable code that when run by one or more processors (e.g., processor 402) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

The invention claimed is:

1. A method comprising:
receiving, with a Physical Function (PF) of a network device associated with a hypervisor, a data packet destined for a virtual machine supported by the hypervisor, the data packet being received after the virtual machine has started, before a driver for a virtual network device of the virtual machine is running, and before a device address filter of the PF is programmed;
with the hypervisor, forwarding the data packet to the virtual machine;
with the hypervisor, detecting a guest access to a virtual network device associated with the virtual machine;
with the hypervisor, receiving a list of device addresses;
with the hypervisor, in response to detecting the guest access, programming the device address filter of the PF with the list of device addresses; and
with the network device, after the device address filter is programmed, forwarding incoming data packets destined for the virtual machine directly to a Virtual Function (VF) associated with the virtual network device.

2. The method of claim 1, wherein the guest access is performed by a guest associated with the virtual machine accessing the network device.

3. The method of claim 1, wherein the access includes a bus master enable command.

4. The method of claim 1, wherein the access includes a driver sending a command to the network device.

5. The method of claim 4, wherein the command includes a command that sets a device address of the virtual network device.

6. The method of claim 5, wherein the device address is a Media Access Control (MAC) address.

7. The method of claim 1, further comprising:
configuring by the hypervisor, the network device to forward a plurality of subsequent incoming data packets from the PF to the VF until a second guest accesses the virtual network device.

8. The method of claim 7, further comprising:
in response to the second guest access, forwarding the plurality of subsequent incoming data packets to the virtual machine by the hypervisor.

9. The method of claim 8, further comprising:
with the hypervisor, after receiving an indication of the guest access, forwarding subsequent incoming data packets to the virtual machine.

10. A system comprising:
a processor; and
a memory comprising machine readable instructions that when executed by the processor, cause the system to:
receive, with a Physical Function (PF) of a network device associated with a hypervisor, a data packet destined for a virtual machine supported by the hypervisor, the data packet being received after the virtual machine has started, before a driver for a virtual network device of the virtual machine is running, and before a device address filter of the PF is programmed;
forward the data packet to the virtual machine;
detect an event that indicates that the driver for the virtual network device associated with the virtual machine is up;
receive a list of device addresses
program, in response to detecting the event, the device address filter of the PF with the list of device addresses; and
forward, after the device address filter is programmed, incoming data packets destined for the virtual machine directly to a Virtual Function (VF) associated with the virtual network device.

11. The system of claim 10, wherein the event includes a guest associated with the virtual machine accessing the network device.

12. The system of claim 10, further comprising:
forward a plurality of subsequent incoming data packets from the PF to the VF until an indication that the driver is down is received.

13. The system of claim 10, further comprising:
in response to receiving an indication that the driver is down, refraining from directly sending incoming packets to the VF.

14. The system of claim 13, further comprising:
forward, after receiving the indication, subsequent incoming data packets to the virtual machine.

15. The system of claim 10, wherein the event includes a bus master enable command.

16. The system of claim 10, wherein the event includes the driver sending a command to the network device.

17. A non-transitory machine-readable medium comprising a plurality of machine-readable instructions which when executed by one or more processors associated with a server are adapted to cause the one or more processors to perform a method comprising:
receiving, with a Physical Function (PF) of a network device associated with a hypervisor, a data packet destined for a virtual machine supported by the hypervisor, the data packet being received after the virtual machine has started, before a virtual network device driver of the virtual machine is running, and before a device address filter of the PF is programmed;
forwarding the data packet to the virtual machine;
detecting an event that indicates that the driver for the virtual network device associated with the virtual machine is up;
receiving a list of device addresses;
in response to detecting the event, programming the device address filter of the PF with the list of device addresses; and
after the device address filter is programmed, forwarding incoming data packets destined for the virtual machine directly to a Virtual Function (VF) associated with the virtual network device.

18. The non-transitory machine-readable medium of claim 17, wherein the event includes the driver sending a command to the network device.

19. The non-transitory machine-readable medium of claim 18, wherein the command includes a command that sets a device address of the virtual network device.

20. The non-transitory machine-readable medium of claim 19, wherein the device address is a Media Access Control (MAC) address.

* * * * *